Dec. 16, 1969 D. R. HADDEN, JR 3,484,759

ANISOTROPIC MAGNETIC MEMORY HAVING SONIC WAVE TRANSDUCER

Filed Jan. 27, 1965

INVENTOR,
DAVID R. HADDEN JR.
BY Harry M. Saragovitz, Edward J. Kelly, Herbert Berl & Julian C. Keppler
ATTORNEYS 3,484,759
Patented Dec. 16, 1969

3,484,759

ANISOTROPIC MAGNETIC MEMORY HAVING SONIC WAVE TRANSDUCER

David Rodney Hadden, Jr., Cold Spring Harbor, N.Y., assignor to the United States of America as represented by the Secretary of the Army Filed Jan. 27, 1965, Ser. No. 428,588
Int. Cl. G11b *5/00*
U.S. Cl. 340—174 8 Claims

ABSTRACT OF THE DISCLOSURE

An anisotropic magnetic memory array includes a substrate having a sonic wave transducer mounted at one end and a sonic wave absorber mounted at the other. Deposited on the surface of the substrate are a plurality of memory elements each comprising a first thin film strip of magnetic material, a thin film strip of conductive material and a second thin film of magnetic material. The magnetic material is formed such as to have an easy axis of remanent flux in a direction perpendicular to the direction in which the sonic wave will travel in the substrate. The thin film strips of conductive material are connected to means for generating current pulses and a means for detecting current pulses.

The invention described herein may be manufactured and used by or for the Government for governmental purposes without the payment of any royalty thereon.

The present invention relates to high density data storage devices and more particularly to improvements in anisotropic thin magnetic film memory devices which have the attribute of coincident current and strain selection.

In the field of data storage it has been the general practice to employ anisotropic magnetic memory devices to store large quantities of digital information in a relatively small space. In such devices digital information is recorded by either reversing or not reversing the direction of the remanent flux in small sections along the length of the anisotropic material. The direction of the flux in a small section is reversed by the combined effect of a mechanical strain and a magnetic field applied simultaneously to the particular section. One of the advantages of thin magnetic films over bulk construction is the ability to produce rotational switching of the magnetic vector with reasonably low magnetic fields. Those concerned with the development of thin film magnetic memories have long recognized the need for a multiple memory configuration which can be arrayed into a larger memory array simply by adding basic memory devices. Another desirable feature is that the basic memory device itself be of such configuration as to permit a plurality of memory elements on each device. The present invention fulfills this need.

The general purpose of this invention is to provide a memory element which lends itself to modular construction. To obtain this, the present invention contemplates a unique configuration of a memory device comprising a plurality of anisotropic thin magnetic tubular films having a circumferential easy axis of remanent flux and encasing a thin conductive film for producing the driving field.

The exact nature of this invention as well as the objects and advantages thereof will be readily apparent from consideration of the following specification relating to the annexed drawing, in which.

Figure 1:
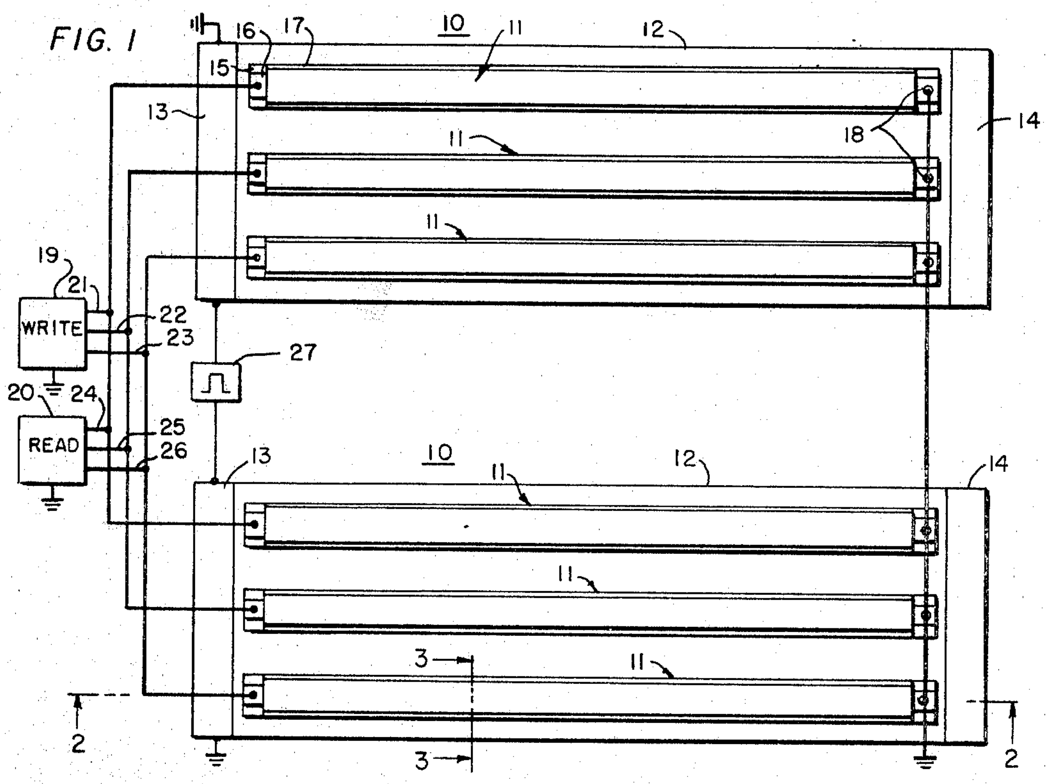
FIG. 1 shows a plan view of a preferred embodiment of the invention.
Figure 2:
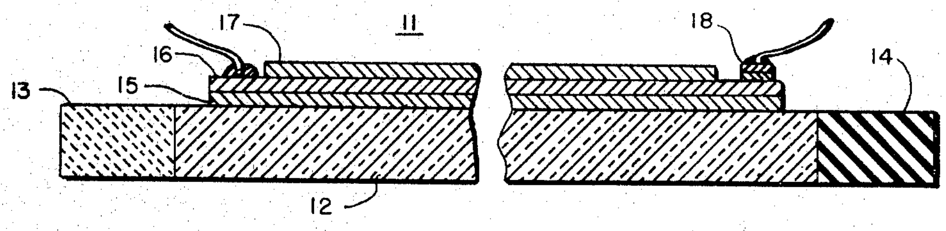
FIG. 2 shows an enlarged section of the device taken on the line 2—2 of FIG. 1 looking in the direction of the arrows.

Referring now to the drawing, wherein like reference characters designate like or corresponding parts throughout the several views, there is shown in FIG. 1 an array of memory devices 10, each device 10 comprising a plurality of memory elements 11 mounted on a substrate 12. Substrate 12 may be made of any of the well-known substances having good elastic characteristics such as glass or quartz. Mounted at one end of substrate 12 is a transducer 13, such as a piezoelectric crystal, for producing a sonic wave in the substrate 12. An absorbing medium 14 such as rubber is mounted at the opposite end for preventing reflections of the sonic waves. It is to be understood that any of the other well-known transducers and termination means may be used in place of those shown. A pulse generator 27 is connected to the transducers 13 for energizing same.

Each magnetic element 11 includes a first strip of anisotropic thin magnetic film 15, a strip of thin conductive film 16, and a second strip of anisotropic thin magnetic film 17. It is understood that the relative dimensions shown in the figures are chosen for convenience and are not meant to be realistic. For example, films 15, 16, and 17 may be between 100 A. and 10,000 A. in thickness.

At one end of each conductive film 16 is a rectifier 18. Any of the well-known thin film rectifier means may be employed. All of the rectifiers are then connected in common and grounded. The other end of the conductive films 16 are connected to a current pulse generator 19 and a current detector 20. Generator 19 has a plurality of outputs 21, 22, and 23 equal to the number of memory elements 11 on each memory device 10. Output 21 is connected to the top conductive film 16 on each element 11, output 22 is connected to the middle conductive film 16 of each element 11, and output 23 is connected to the bottom conductive film 16 of each element 11. The detector 20 has three inputs 24, 25, and 26 connected respectively to the top, middle, and bottom films 16 of each element 11.

The principles of coincident current and strain selection are well known and will be only briefly described here. It is well known that an anisotropic magnetic material will have a remanent flux which is oriented in one of two directions along the easy axis of the magnetic material.

The direction of the remanent flux may be switched or rotated from one of these two directions to the other by applying to the material a sufficiently large magnetic field in the desired direction. The size of the applied magnetic field required to rotate the remanent flux can be lowered by applying a mechanical strain to the material at an angle to the easy axis. The mechanical strain will deform the crystals which form the magnetic material, thereby rotating the easy axis through an angle and reducing the requirement on the amount of applied field required to rotate the remanent flux. Therefore, a small domain of remanent flux directed in either of two directions may be established in the material by simultaneously applying to the particular section of the magnetic material a mechanical strain and a magnetic field large enough to rotate remanent flux in the small section and yet small enough not to rotate the remanent flux in the remainder of the material.

Figure 3:
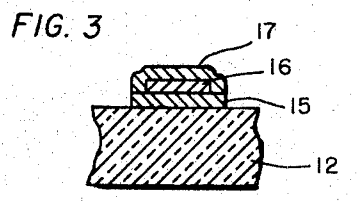
FIG. 3 shows another enlarged section of the device taken on the line 3—3 of FIG. 1 looking in the direction of the arrows.

The magnetic films 15 and 17 of the present invention has a circumferential easy axis of remanent flux which lies in the plane of the paper as seen in FIG. 3. In other words, the easy axis is directed transverse to the longitudinal axis of the strips 15 and 17 and the remanent flux is fully contained in the films 15 and 17. The direction of the remanent flux in film 15 is opposite to the direction of the flux in film 17, i.e., if the flux in film 15 is directed to the right as viewed in FIG. 3, the direction of the flux in film 17 will be directed to the left. Since the films 15 and 17 form a tube, the magnetic lines from one film are joined to those on the other film. Because substantially all of the remanent flux is contained in the films 15 and 17, the device will be relatively stable and the adjacent strips may be placed closer together without creating interference. The easy axis of the combination of films 15 and 17 may be referred to as a circumferential easy axis and the combined remanent flux may be considered to be directed either clockwise or counter-clockwise as viewed in FIG. 3.

Selection of a particular element 11 to receive information is accomplished by the combined selection characteristics of generators 19 and 27. Generator 27 will select the particular substrate 12 while generator 19 will select the particular element 11. Diodes 18 will prevent sneak circuits. For example, if one wished to store information on the center element 11 of the top substrate, generator 27 should be actuated to excite the transducer 13 of the top substrate to produce a sonic wave therein and generator 19 should then apply pulses to line 22 in accordance with the information to be stored as the sonic wave travels along the substrate 12. Information may be read out by having detector 20 select a particular element 11 and having generator 27 excite the particular transducer 13. As the sonic wave travels down the substrate, currents will be induced in the associated conductive film 16 in accordance with the stored information. Again the diodes will isolate the conductive films 15 from each other.

If the substrates 12 are piled on each other in a modular form, for example, it may be desirable to use a single transducer 13 to generate a sonic wave in all substrates simultaneously. When so modified, the line on each substrate 13 which connects the diodes 18 to each other would be connected to a selector switch which would select the desired substrate and ground the diodes 18 thereon.

Obviously many other modifications and variations of the present invention are possible in the light of the above teachings. It is therefore to be understood, that within the scope of the appended claims, the invention may be practiced otherwise than as specifically described.

What is claimed is:

1. A magnetic memory device comprising: an elongated substrate of non-magnetic material, transducer means connected to said substrate for producing a sonic wave in said substrate, a first elongated strip of anisotropic thin magnetic film mounted on said substrate, an elongated strip of thin conductive film mounted on said first thin magnetic film, and a second anisotropic thin magnetic film completely covering said conductive film except for the extremities thereof.

2. The memory device according to claim 1 and wherein each said magnetic film has an easy axis of remanent flux lying in a plane transverse to the direction of propagation of said sonic wave and pointing in directions opposite to each other.

3. The memory device according to claim 1 and further including means for producing current pulses in said

4. The memory device according to claim 2 and further including means for detecting current pulses induced in said conductor.

5. A magnetic memory device comprising: a substrate of non-magnetic material; transducer means connected to one end of said substrate for producing a sonic wave in said substrate; means at the opposite end of said substrate for preventing reflections of said sonic wave in said substrate; and a strip of thin conductive film covered on all sides except for the extremities with an anisotropic thin magnetic film having a circumferential easy axis of remanent flux mounted on said substrate.

6. A magnetic memory array comprising: a plurality of magnetic memory elements; each said element including an elongated substrate of non-magnetic material, a plurality of elongated tubes of anisotropic thin magnetic film mounted on said substrate and having a circumferential easy axis of remanent flux, each said tube of magnetic film having a thin conductive film mounted in its bore; a current pulse generator means being connected to one end of each said conductive film for selectively generating current pulses in one said conductive film of each of said elements; and transducer means connected to said elements for selectively propagating, in the substrate of a predetermined one of said elements, a sonic wave having a component parallel to the longitudinal axis of said elongated tubes.

7. The memory array according to claim 6 and further including means connected to said one end of each said conductive films for detecting induced current pulses in a selective one of said conductive films of each said element.

8. The memory array according to claim 7 and further including a thin film rectifier means having one side mounted on the other end of each of said conductive film and having the other sides connected in common and to ground.

References Cited

UNITED STATES PATENTS

| | | | |
|---|---|---|---|
| 3,138,789 | 6/1964 | Pugh | 340—174 |
| 3,339,188 | 8/1967 | Weinstein | 340—174 |
| 3,354,447 | 11/1967 | Oshima | 340—174 |

STANLEY M. URYNOWICZ, Jr., Primary Examiner